United States Patent
Fu et al.

(10) Patent No.: US 7,852,325 B2
(45) Date of Patent: Dec. 14, 2010

(54) RF PULSE SYNCHRONIZATION FOR DATA ACQUISITION OPERATIONS

(75) Inventors: Jack I-Chieh Fu, Milpitas, CA (US); Christopher Tenzin Mullens, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 871 days.

(21) Appl. No.: 11/620,466

(22) Filed: Jan. 5, 2007

(65) Prior Publication Data

US 2008/0165157 A1    Jul. 10, 2008

(51) Int. Cl.
G06F 3/042        (2006.01)
G06F 3/043        (2006.01)

(52) U.S. Cl. .................. 345/174; 345/175; 345/176; 370/201; 700/94

(58) Field of Classification Search .............. 345/58, 345/156, 162, 173, 174–176, 179; 370/201, 370/229; 455/2, 114, 295; 700/94
See application file for complete search history.

(56) References Cited

U.S. PATENT DOCUMENTS

| | | | |
|---|---|---|---|
| 5,287,074 A | 2/1994 | Meguro et al. |
| 5,483,261 A | 1/1996 | Yasutake |
| 5,488,204 A | 1/1996 | Mead et al. |
| 5,610,629 A | 3/1997 | Baur |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,511,702 B2 | 3/2009 | Hotelling |
| 7,538,760 B2 | 5/2009 | Hotelling et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |

FOREIGN PATENT DOCUMENTS

| | | |
|---|---|---|
| EP | 1901157 A2 | 3/2008 |
| GB | 2424993 A | 10/2006 |
| JP | 2000076002 | 3/2000 |
| JP | 2000-163031 A | 6/2000 |

(Continued)

OTHER PUBLICATIONS

International Search Report mailed Dec. 23, 2008, for PCT Application No. PCT/US2007/089165, filed Dec. 28, 2007, three pages.

(Continued)

*Primary Examiner*—Amare Mengistu
*Assistant Examiner*—Aaron M Guertin
(74) *Attorney, Agent, or Firm*—Morrison & Foerster LLP (57) ABSTRACT

Data acquisition from a touch-surface input unit may be disrupted during the generation of radio frequency ("RF") pulses. To mitigate this problem, touch-surface data acquisition is temporarily halted during RF pulse generation. Data collected prior to temporarily halting is retained, with subsequently acquired data being added to prior collected data.

7 Claims, 5 Drawing Sheets

FOREIGN PATENT DOCUMENTS

| | | |
|---|---|---|
| JP | 2002-342033 A | 11/2002 |
| WO | WO-2008/085786 A2 | 7/2008 |
| WO | WO-2008/085786 A3 | 7/2008 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

RF PULSE SYNCHRONIZATION FOR DATA ACQUISITION OPERATIONS

RELATED APPLICATIONS

The subject matter claimed herein is related to the subject matter described in U.S. patent application Ser. No. 10/840,862 entitled "Multipoint Touchscreen" by Steve Hotelling and Brian Huppi (filed 6 May 2004), Ser. No. 11/278,080 entitled "Force Imaging Input Device and System" by Steve Hotelling and Brian Huppi (filed 30 Mar. 2006) and Ser. No. 11/382,402 entitled "Force and Location Sensitive Display" by Steve Hotelling (filed 9 May 2006), all of which are hereby incorporated by reference.

BACKGROUND

The invention relates generally to power consumption and noise mitigation techniques for electronic devices. More particularly, but not by way of limitation, the invention relates to reducing or avoiding operational problems caused by power droops and electrical interference during touch-surface data acquisition operations in portable electronic devices that generate radio frequency ("RF") pulses.

The use of touch pads and touch screens (collectively "touch-surfaces") has become increasingly popular in electronic systems because of their ease of use and versatility of operation. In general, these systems employ a two dimensional grid or array of sensing elements. Each sensing element (aka "pixel") generates an output signal indicative of the electric field disturbance (for capacitance sensors), force (for pressure sensors) or optical coupling (for optical sensors) at the sensor element. The ensemble of pixel values represents an "image."

In portable electronic devices such as mobile telephones and personal digital assistants ("PDA") that use a touch-surface for user input and that also generate radio frequency ("RF") pulses for communication, there is a problem in that touch-surface data acquisition cannot reliably or accurately occur during RF pulse transmission. This is primarily due to two factors. First, the power required to generate a RF pulse can cause a voltage drop large enough to interfere with the normal operation of a touch-surface's data acquisition circuitry. Second, the resulting RF pulse can generate sufficient electrical noise to interfere with the acquisition of touch-surface data.

Another complicating factor in devices of this type is the need to generate RF pulses at a rate that is more frequent than the time it takes to capture a complete image from the touch-surface. By way of example, mobile telephones conforming to the Global System for Mobile Communications specification (e.g., GSM 05.01, version 8.4.0) transmit RF pulses approximately every 4.6 milliseconds, with each pulse lasting 577 microseconds for voice transmission or 1,154 microseconds for data transmission. Touch-surface image acquisition operations, however, may take more the inter-pulse duration allowed by such specifications. Thus, it would be beneficial to provide a means to mitigate the operational interference to touch-surface data acquisition operations in portable electronic devices that generate RF pulses.

SUMMARY

In one embodiment, the invention provides a method to acquire touch-surface senor data from a portable radio frequency ("RF") capable electronic device. The method includes acquiring data from a first set of sensors associated with the touch-surface (e.g., a first row of pixel data), recording the data if a RF pulse is not detected during the act of acquiring and otherwise discarding the data and repeating the act of acquiring after the RF pulse terminates, and the acts of acquiring and recording for a second set of sensors associated with the touch-surface. In one embodiment, the acts of acquiring and recording are initiated for successive sets of touch-surface sensors at regular intervals. In another embodiment, the acts of acquiring and recording are initiated a specified time period after the act of recording is completed. Methods in accordance with the invention may be stored in any media that is readable and executable by a computer system. In addition, the described method may be incorporated in any portable electronic device capable of providing RF-based communication (e.g., voice and/or data communication).

DETAILED DESCRIPTION

The following description is presented to enable any person skilled in the art to make and use the invention as claimed and is provided in the context of the particular examples discussed below (e.g., a mobile telephone conforming to the Global System for Mobile Communications specifications), variations of which will be readily apparent to those skilled in the art. Accordingly, the claims appended hereto are not intended to be limited by the disclosed embodiments, but are to be accorded their widest scope consistent with the principles and features disclosed herein.

Figure 1A:
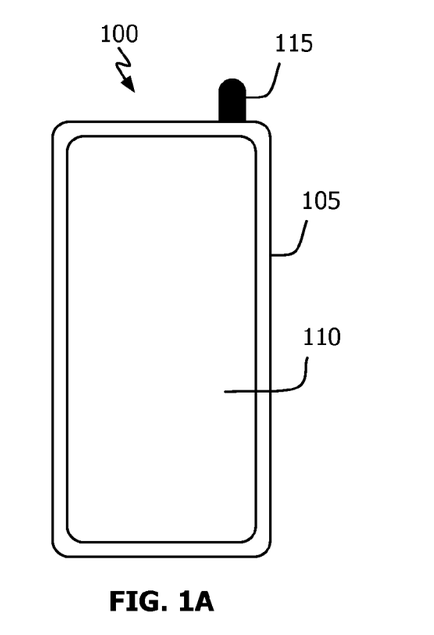
FIGS. 1A-1C show a portable electronic device in accordance with one embodiment of the invention.

Referring to FIG. 1A, portable electronic device 100 in accordance with one embodiment of the invention comprises body or case 105, touch-surface 110 and antenna 115. In accordance with this embodiment, touch-surface 110 covers substantially all of device 100's front surface, uses mutual capacitance sensing elements arranged in a two-dimensional grid and is capable of detecting multiple simultaneous contacts. Antenna 115 is used to transmit and receive information in accordance with Global System for Mobile Communications standards.

Figure 1B:
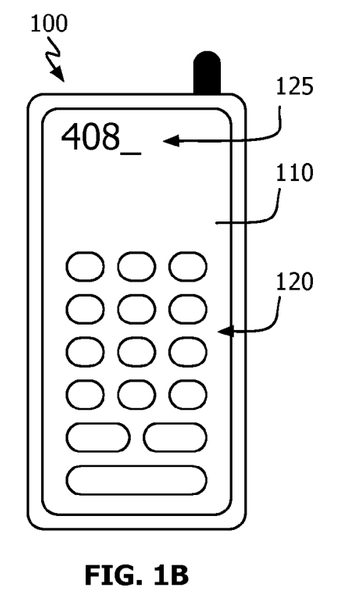
Figure 1C:
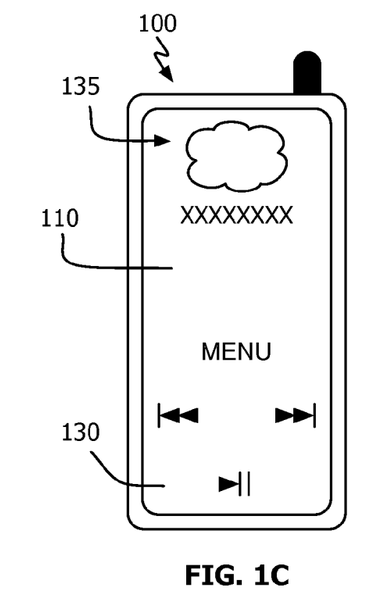

Referring to FIG. 1B, in one operational mode electronic device 100 may provide mobile phone functionality. In this mode, touch-surface 110 is used to display soft-keys 120 (e.g., a standard alphanumeric telephone keypad), accept user input (e.g., finger or stylus contact), and to display user feedback 125 (e.g., previously selected soft-keys). Referring to FIG. 1C, in another mode electronic device 100 may provide music and/or video playback functionality. In this mode, touch-surface 110 is used to display audio/video playback control soft-keys 130 (e.g., MENU, skip forward, skip backward, pause and play soft-keys), accept user input (e.g., finger or stylus contact), and to display playback information 135 (e.g., menu items, song title, album cover art, volume control and/or current play position). In still another embodiment, electronic device 100 may provide web browsing functionality. Here, touch-surface 110 is used to display web page manipulation soft-keys 130 (e.g., refresh, go back, go forward, close and URL entry. It will be recognized that electronic device 100 may also provide additional capability such as, for example, address book and calendar functionality.

Figure 2:
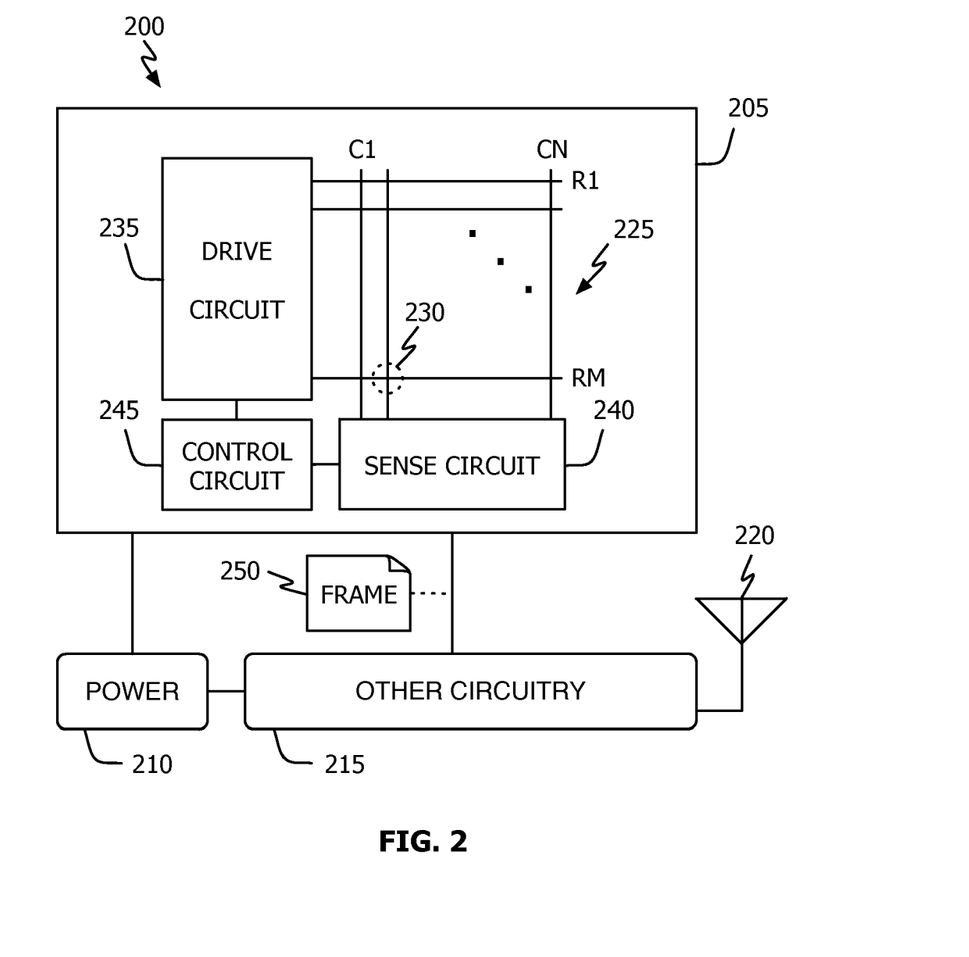
FIG. 2 shows, in block diagram form, an electronic device in accordance with one embodiment of the invention.

Referring to FIG. 2, electronic device 200 in accordance with one embodiment of the invention comprises mutual capacitance touch-surface component 205, power source 210, other circuitry 215 and antenna 220. Power circuit 210 provides the energy necessary to power touch-surface component 205, other circuitry 215 and the transmission of RF signals via antenna 220. Other circuitry 215 typically includes one or more computer processors, memory and RF transmission and receiving circuitry.

In capacitive touch-surfaces such as that shown in FIG. 2 (e.g., 205), a first set of conductive traces run in a first direction (e.g., rows R1 to RM) and are insulated by a dielectric insulator from a second set of conductive traces running in a second direction (e.g., columns C1 to CN). Grid 225 formed by the overlapping conductive traces create an M×N array of capacitors that can store electrical charge. Each capacitive sensing element is referred to as a pixel, e.g., pixel 230. When an object such as a stylus or finger is brought into proximity or contact with array 225, the capacitance of the pixels at that location change. This change can be used to identify the location of the touch event. (Touch-surface component 205 may also detect the force applied to its surface.) In practice, circuit 235 drives one (or a few) rows of array 225 at a time and circuit 240 captures signal values indicative of the pixels in the driven row(s). When this operation is complete for a first row (or group of rows), circuit 235 drives a next row (or group of rows) and circuit 240 captures pixel values associated with the newly driven row(s). This process is repeated, under control of circuit 245, until all pixel values in array 225 have been captured. The ensemble of pixel values is referred to as an image or frame (e.g., frame 250).

It has been found that in some RF generating portable electronic devices, operational voltage from power source 210 (e.g., a battery) to a touch-surface component 205 can drop sufficiently low during RF pulse transmission to interfere with the reliable acquisition of frame data (e.g., the accurate reading of pixel data). It has further been found that electrical noise attributable to the transmission of an RF signal can cause frame acquisition errors due to the increased electrical current required for RF transmission. Thus, it would be beneficial to avoid acquiring touch-surface frame data during RF signal transmission.

For proper operation and to ensure a responsive user interface however, a frame should be obtained frequently (e.g., every 5 to 20 milliseconds). In many RF-capable electronic devices, however, it may be necessary to transmit RF signals too frequently to permit a frame from being acquired all at once without colliding with RF pulse transmission. For example, the Global System for Mobile Communications standard 05.01, version 8.4.0, requires that an RF pulse be transmitted approximately every 4.6 milliseconds, with voice being encoded in 577 microsecond bursts and data being encoded in 1,154 microsecond bursts (leaving between approximately 3.4 to 4.0 milliseconds between successive RF pulses). To mitigate against these operational requirements, a method in accordance with the invention holds off acquiring touch-surface frame data during RF signal transmission.

Figure 3:
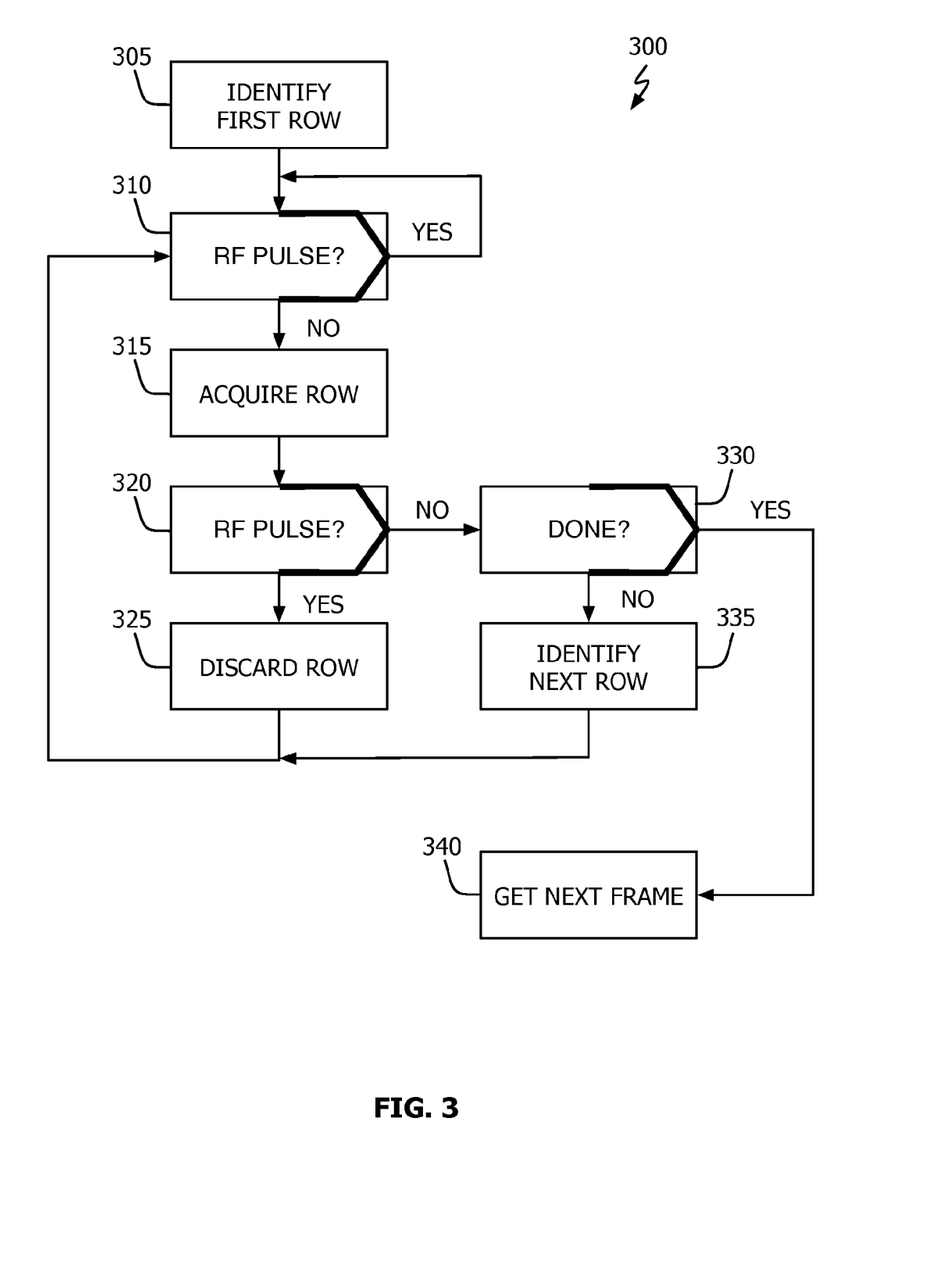
FIG. 3 shows, in flowchart form, a frame acquisition method in accordance with one embodiment of the invention.

Referring to FIG. 3, in one embodiment of the invention touch-surface frame acquisition 300 is performed on a row-by-row basis. To begin, a first row of sensors from among the plurality of rows in a sensor matrix is identified (block 305). A test is then made to determine if a RF pulse is currently being generated (block 310). If a RF pulse is being generated (the "Yes" prong of block 310), frame/row data acquisition is postponed. If no RF pulse is detected (the "No" prong of block 310), data is acquired from the identified row of touch-surface sensors (block 315). Following acquisition, another check is made to determine if a subsequent or next RF pulse was transmitted at any time during the acts of block 315 (block 320). If such a RF pulse was detected (the "Yes" prong of block 320), the "just acquired" sensor data is discarded (block 325) and processing continues at block 310. That is, if the row of pixels just captured did not complete before the start of a subsequent RF pulse, the row is discarded. As used herein, a row of pixel data is "complete" if the row's pixel values are detected (and, typically, digitized) and stored to a memory (typically buffer memory associated with circuit 240) before a RF pulse is detected. If no RF pulse is detected (the "No" prong of block 320), a check is made to determine if a complete frame has been collected (block 330). If a complete frame has not been acquired (the "No" prong of block 330), the next row of sensors is identified (block 335) whereafter processing continues at block 310. If a complete frame has been acquired (the "Yes" prong of block 330), data acquisition begins anew for the next frame (block 340).

Two frame acquisition operations in accordance with FIG. 3 are of interest. The first is when frame acquisition onset occurs simultaneously with RF pulse generation (see FIG. 4A). The second is when frame acquisition onset occurs immediately following RF pulse generation (see FIG. 4B). In each of FIGS. 4A and 4B, T(SAMPLE) refers to the frame acquisition sample period, T(ACQUIRE) refers to the time actually required to capture a frame, T(RF) refers to the RF pulse period and T(PULSE) refers to the duration of each RF pulse. For illustrative purposes only, T(SAMPLE), T(ACQUIRE), T(RF) and T(PULSE) for electronic devices conforming to the Global System for Mobile Communications specification (e.g., GSM 05.01, version 8.4.0) are as follows: T(RF)~4.6 milliseconds; and T(PULSE)~0.577 milliseconds (voice) or ~1.1 milliseconds (data). For the purpose of this description, T(SAMPLE) will be taken as approximately 14 milliseconds and T(ACQUIRE) will be taken as approximately 7 milliseconds.

Figure 4A:
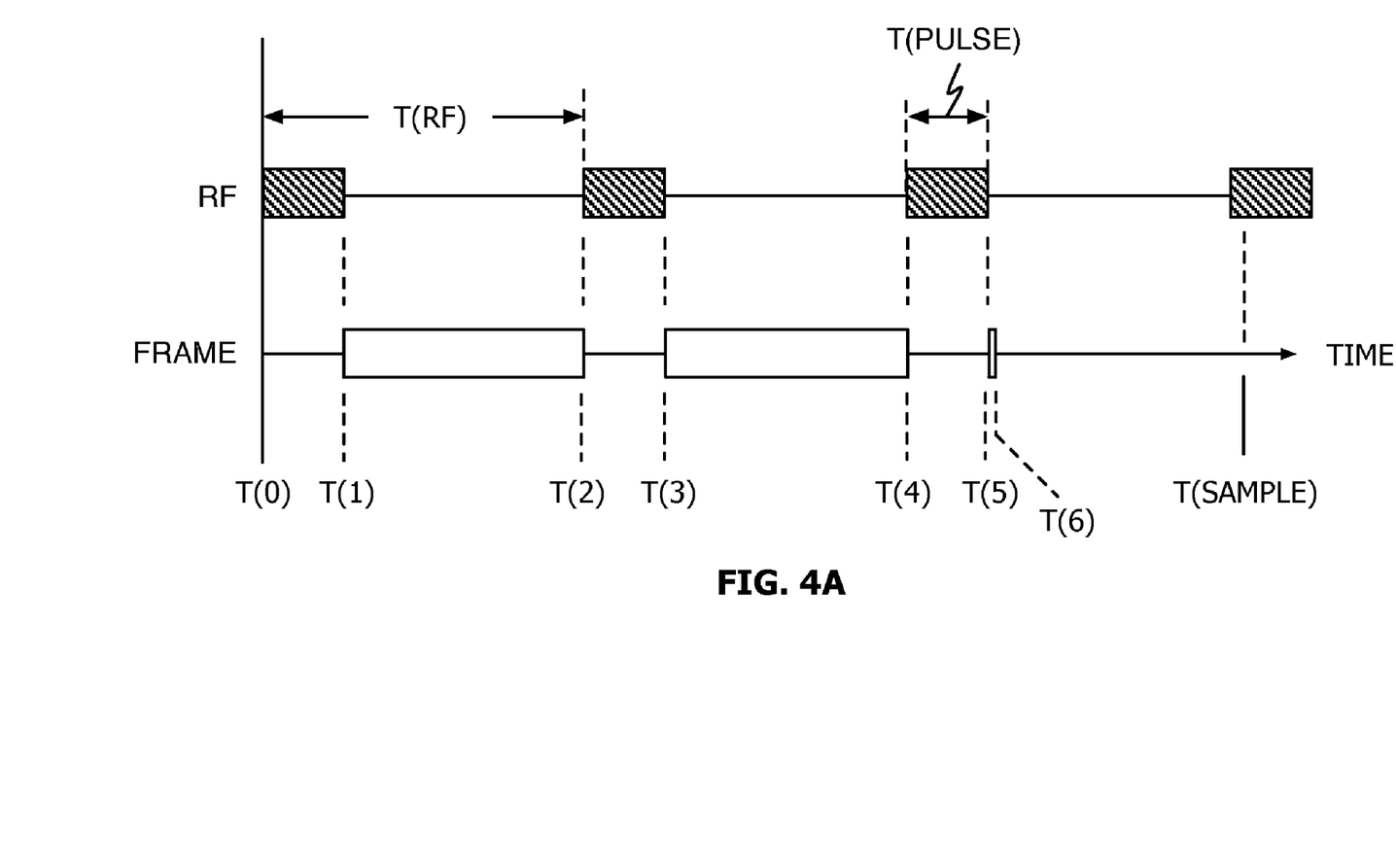
FIGS. 4A and 4B show frame acquisition time lines in accordance with the invention.
Figure 4B:
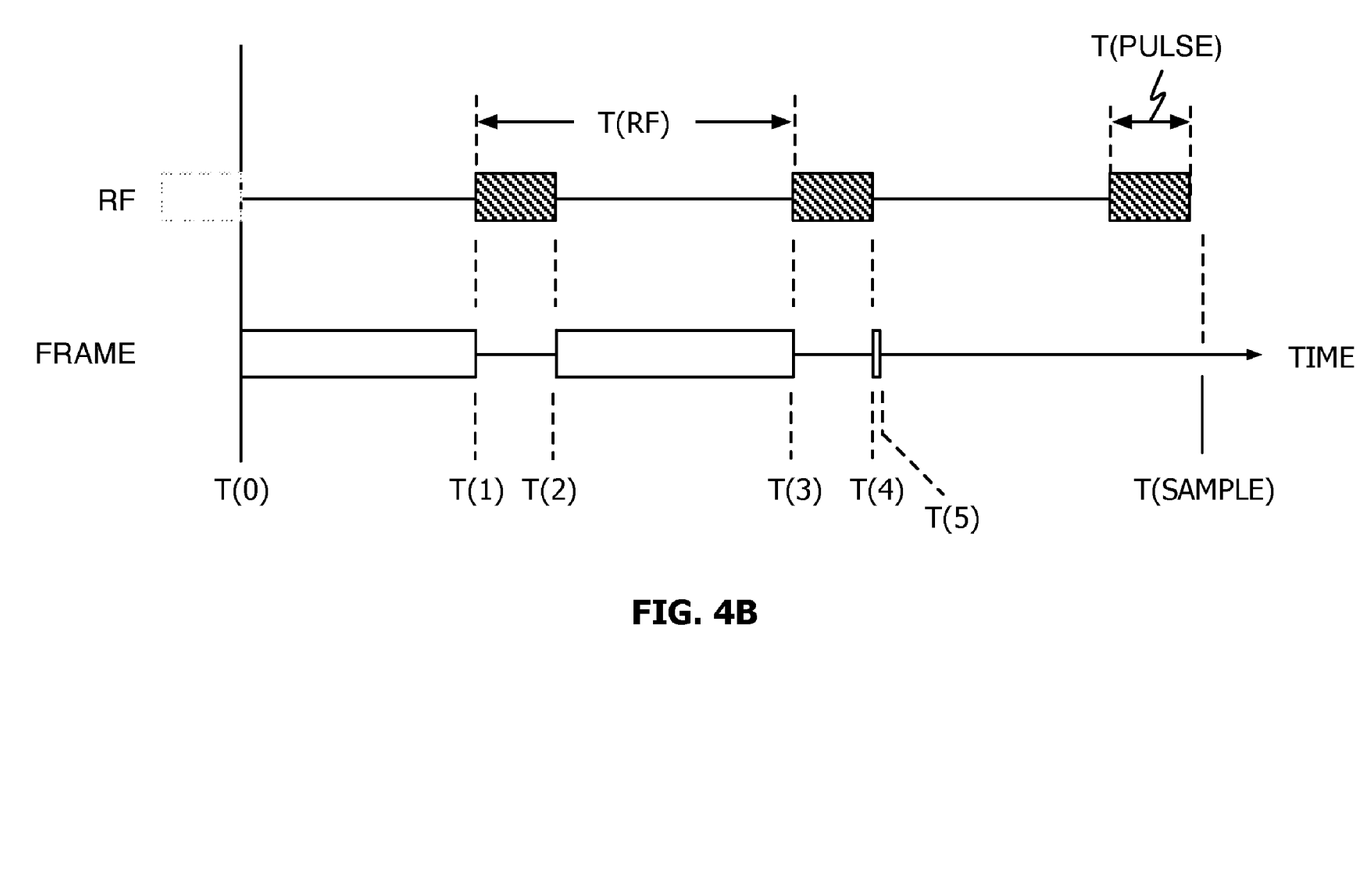

Referring to FIG. 4A, if frame acquisition onset coincides with RF pulse generation at time T(0), frame acquisition is delayed until RF pulse generation completes at time T(1). Frame acquisition then continues until time T(2) when another RF pulse is generated. As shown, this process repeats until a complete frame is acquired at time T(6). See also FIG. 3. Accordingly, T(ACQUIRE)=[T(2)−T(1)]+[T(4)−T(3)]+[T(6)−T(5)]. Referring now to FIG. 4B, if frame acquisition onset immediately follows completion of a RF pulse, at time T(0), it will continue until RF pulse generation begins again at time T(1). Frame acquisition begins again at time T(2) following completion of RF pulse generation. As shown, this process repeats until a complete frame is acquired at time T(5). In this scenario, T(ACQUIRE)=[T(1)−T(O)]+[T(3)−T(2)]+[T(5)−T(4)].

Referring again to FIG. 3, in one embodiment acts in accordance with block 340 begin a specified sample period after the completion of acts in accordance with block 330. That is, there is at least a specified period between the time a first frame is completely acquired and initiating the acquisition of the next or subsequent frame. For example, in FIG. 4A this approach would initiate a new frame acquisition operation no sooner than the time [T(6)+T(SAMPLE)]. In FIG. 4B, a new frame acquisition operation would begin no sooner than the time [T(5)+T(SAMPLE)]. In another embodiment, acts in accordance with block 340 are performed as soon after a prior frame is acquired as permitted, but no sooner than a specified period of time after the prior frame was scheduled to begin. In FIG. 4A this approach would initiate a new frame acquisition operation no sooner than the time T(SAMPLE) after time T(0)- delaying only if another RF pulse coincides with the scheduled onset of frame acquisition operations. Similarly, in FIG. 4B a new frame acquisition operation would begin no sooner than the time T(SAMPLE).

With respect to FIGS. 4A and 4B, it will be recognized by one of ordinary skill in the art that frame acquisition operations cannot actually be initiated simultaneously with cessation of RF pulse generation. There is generally a short time between when an RF pulse begins and ends and when these events can be detected. In practice, "detection" times are small and, for convenience, have been omitted from FIGS. 4A and 4B.

Various changes in the materials, components, circuit elements, as well as in the details of the illustrated operational method are possible without departing from the scope of the following claims. For instance, it will be recognized by those of ordinary skill in the art, that the inventive concept described herein is not limited to the device configuration illustrated in FIGS. 1A-1C. For example, electronic device 100 may include: additional keys or buttons (e.g., an on/off button); an internal (rather than an external) antenna; a touch-surface that does not take up substantially all of the device's top surface; a touch-surface that is not capable of detecting multiple simultaneous contacts; a touch-surface that is capable of detecting both touch and force; and a touch-surface utilizing sensor elements other than capacitors (e.g., a pressure or optically-based touch-surface). It will also be recognized that detection of RF pulse generation may be made in any number of ways. For example, a control signal from RF generation circuitry in circuit 215 may indicate when an RF pulse is being transmitted and when it is not being transmitted. In another embodiment, a common clock signal may be used to generate RF pulses and indicate when such pulses are being generated. In still another embodiment, frame acquisition may acquire multiple rows simultaneously. In this case, the multiple-rows may be treated as a single row for purposes of method 300. In yet another embodiment, frame acquisition may employ multiple samples. For example, acquisition of a single row may entail two or more separate samples each at a different frequency. In addition, acts in accordance with FIG. 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs" or field programmable gate array ("FPGAs"). Storage devices suitable for tangibly embodying program instructions include, but are not limited to: magnetic disks (fixed, floppy, and removable); optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A portable electronic device providing telephone functionality, comprising:
a radio frequency ("RF") generation circuit;
a RF pulse detection circuit, operatively coupled to the RF generation circuit, for indicating when a RF pulse is being generated by the RF generation circuit;
a touch-surface sensor array for detecting user input;
a sense circuit, operatively coupled to sensors in the touch-surface sensor array, for acquiring data from the sensors in the touch-surface sensor array; and
a control circuit, operatively coupled to the RF pulse detection circuit and the sense circuit, for controlling the sense circuit, the control circuit adapted to—
cause the sense circuit to acquire first data from a first set of sensors associated with the touch-surface sensor array,
cause the sense circuit to acquire second data from a second set of sensors associated with the touch-surface sensor array if the RF pulse detection circuit indicates a RF pulse is not currently being generated, and, if the RF pulse detection circuit indicates a RF pulse is currently being generated, to cause the sense circuit to acquire the second data after the RF pulse has terminated, and,
if the RF pulse detection circuit indicates a RF pulse was not generated during the act of acquiring the second data, to acquire third data from a third set of sensors associated with the touch-surface sensor array, and, if the RF pulse detection circuit indicates a RF pulse was being generating during the act of acquiring the second data, to discard the second data and to wait until the RF pulse detection circuit indicates the RF pulse has terminated before causing the control circuit to retry acquisition of the second data.

2. The portable electronic device of claim 1, wherein the control circuit is further adapted to cause the sense circuit to acquire additional data from one or more additional sets of sensors associated with the touch-surface sensor array, wherein the combination of the first, second, third and additional data comprise a first frame of data.

3. The portable electronic device of claim 2, wherein the control circuit is further adapted to cause a second frame of data to be acquired a specified period of time after acquisition of the first frame was initiated.

4. The portable electronic device of claim 2, wherein the control circuit is further adapted to cause a second frame of data to be acquired a specified period of time after the first frame acquired.

5. The portable electronic device of claim 1, wherein the touch-surface comprises a two-dimensional array of capacitive sensors.

6. The portable electronic device of claim 5, wherein each of the first, second and third sets of sensors comprise non-overlapping groups of sensors.

7. The portable electronic device of claim 6, wherein each group of sensors comprise at least one row of sensors.

* * * * *

UNITED STATES PATENT AND TRADEMARK OFFICE
CERTIFICATE OF CORRECTION

| | | |
|---|---|---|
| PATENT NO. | : 7,852,325 B2 | Page 1 of 1 |
| APPLICATION NO. | : 11/620466 | |
| DATED | : December 14, 2010 | |
| INVENTOR(S) | : Jack I-Chieh Fu et al. | |

It is certified that error appears in the above-identified patent and that said Letters Patent is hereby corrected as shown below:

In column 4, line 51, delete "T(O)]+" and inwert -- T(0)]+ --, therefor.

In column 5, line 50, delete ""ASICs"" and insert -- ("ASICs") --, therefor.

In column 6, line 14, in claim 1, delete "to–" and insert -- to --, therefor.

Signed and Sealed this
Twenty-fifth Day of October, 2011

David J. Kappos
*Director of the United States Patent and Trademark Office*